US012806833B2

(12) United States Patent
Sommer et al.

(10) Patent No.: US 12,806,833 B2
(45) Date of Patent: Nov. 24, 2026

(54) NOZZLE INSERT AND NOZZLE FOR AN INJECTION MOULDING TOOL

(71) Applicant: GÜNTHER Heisskanaltechnik GmbH, Frankenberg (DE)

(72) Inventors: Siegrid Sommer, Burgwald-Ernsthausen (DE); Stefan Sommer, Burgwald (DE); Herbert Günther, Allendorf-Rennertehausen (DE); Torsten Schnell, Lichtenfels-Münden (DE)

(73) Assignee: GÜNTHER Heisskanaltechnik GmbH, Frankenberg (DE)

( * ) Notice: Subject to any disclaimer, the term of this patent is extended or adjusted under 35 U.S.C. 154(b) by 87 days.

(21) Appl. No.: 18/930,433

(22) Filed: Oct. 29, 2024

(65) Prior Publication Data

US 2025/0135695 A1 May 1, 2025

(30) Foreign Application Priority Data

Oct. 30, 2023 (DE) ..................... 10 2023 129 839.9

(51) Int. Cl.
*B29C 45/20* (2006.01)
*B29C 45/00* (2006.01)
*B29C 45/17* (2006.01)

(52) U.S. Cl.
CPC .......... *B29C 45/20* (2013.01); *B29C 45/0025* (2013.01); *B29C 45/176* (2013.01)

(58) Field of Classification Search
CPC .................. B29C 45/20; B29C 45/278; B29C 2045/2779; B29C 2045/2783
See application file for complete search history.

(56) References Cited

U.S. PATENT DOCUMENTS

| | | | |
|---|---|---|---|
| 3,568,256 A | 3/1971 | Johnson et al. | |
| 4,094,447 A | 6/1978 | Gellert et al. | |

(Continued)

FOREIGN PATENT DOCUMENTS

| | | | |
|---|---|---|---|
| CN | 104129042 A * | 11/2014 | ......... B29C 45/2737 |
| DE | 4325064 A1 | 2/1994 | |

(Continued)

OTHER PUBLICATIONS

Extended European Search Report dated Apr. 4, 2025 issued in corresponding application 24209664.2.

(Continued)

*Primary Examiner* — Virak Nguon
(74) *Attorney, Agent, or Firm* — Millen, White, Zelano & Branigan, P.C.; Christopher W. Brody

(57) ABSTRACT

The presented invention relates to a nozzle insert (100) for an injection moulding tool (300), wherein the nozzle insert (100) comprises:

Figure 1:
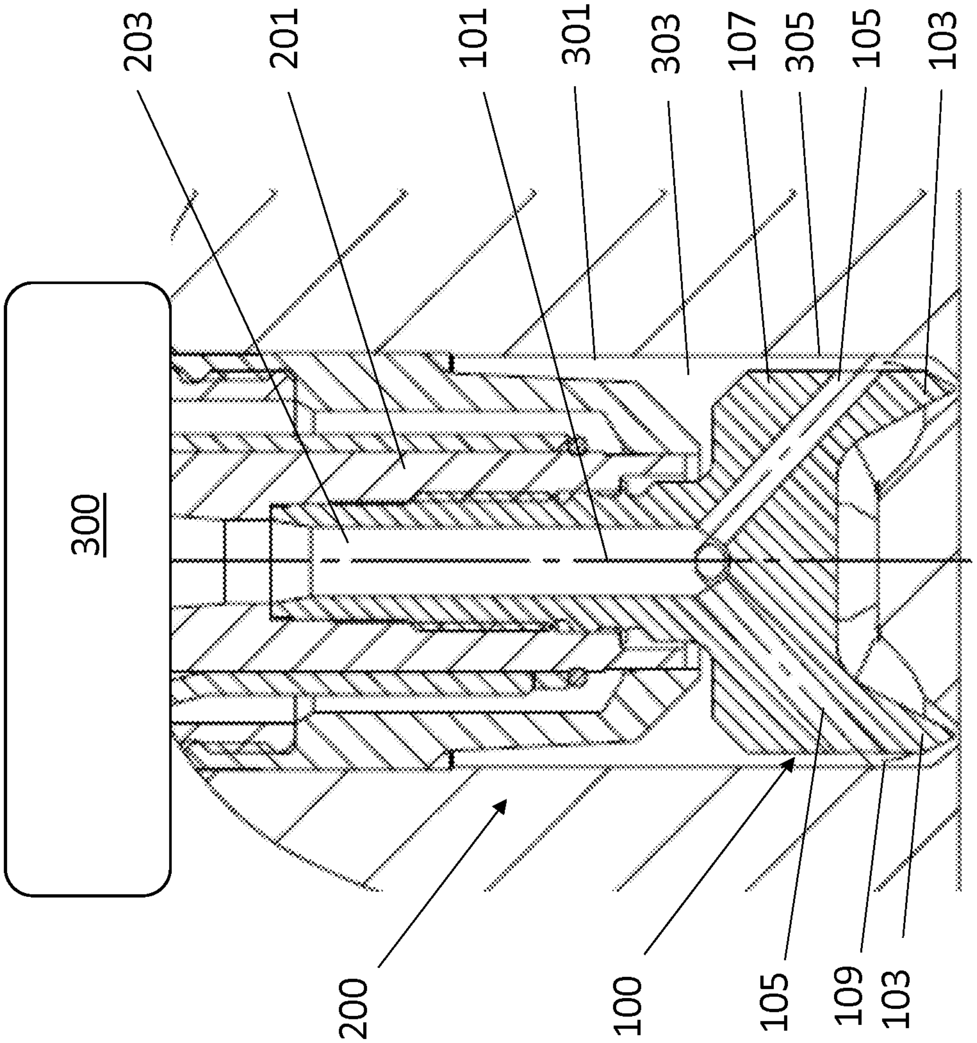

a supply line portion (101) extending in the nozzle insert (100),
a multiplicity of nozzle tips (103), and
a multiplicity of secondary channels (105), wherein respective secondary channels (105) of the multiplicity of secondary channels (105) are fluidically coupled to the supply line portion (101),
wherein a respective secondary channel (105) of the multiplicity of secondary channels (105) is configured to discharge flowable compound, supplied through the supply line portion (101), from a respective nozzle tip (103) of the multiplicity of nozzle tips (103).

25 Claims, 4 Drawing Sheets

(56) References Cited

U.S. PATENT DOCUMENTS

| | | | | |
|---|---|---|---|---|
| 5,268,184 | A | 12/1993 | Gellert | |
| 5,269,676 | A | 12/1993 | Gellert | |
| 5,587,188 | A | 12/1996 | Hepler et al. | |
| 5,641,526 | A | 6/1997 | Gellert | |
| 2002/0098262 | A1 * | 7/2002 | Babin | B29C 45/2735 425/572 |
| 2011/0240687 | A1 * | 10/2011 | Catoen | B29C 45/2735 222/566 |
| 2018/0326632 | A1 * | 11/2018 | Günther | B29C 45/278 |

FOREIGN PATENT DOCUMENTS

| | | | |
|---|---|---|---|
| DE | 10201830 | A1 | 8/2002 |
| DE | 102010013441 | A1 | 10/2011 |
| EP | 0778117 | B1 | 4/2000 |

OTHER PUBLICATIONS

Office Action for corresponding German Application No. 10 2023 129 839.9 dated Jun. 20, 2024.

* cited by examiner

NOZZLE INSERT AND NOZZLE FOR AN INJECTION MOULDING TOOL

The presented invention relates to a nozzle insert and a nozzle for an injection moulding tool and to an injection moulding tool and to a production method according to the attached claims.

Nozzles and nozzle inserts for injection moulding systems are known for example from DE 10 2010 013 859 A1. Accordingly, a nozzle consists of a material tube and of a nozzle insert which are together configured to supply flowable plastics compound at a predefined temperature and relatively high pressure to a separable tool block (mould cavity).

A first end of the material tube is generally connected to a distributor, whilst a second end opposite the first end is positioned opposite a gate in the region of what is known as a pre-chamber. In order for plastics compound to not cool prematurely in the pre-chamber, the nozzle insert is formed with a number of nozzle tips at the second end of the material tube. The nozzle tips are of conical form and are brought up to a respective gate for an injection moulding operation.

For the simultaneous injection moulding of multiple articles, multi-cavity tools are known which comprise multiple cavities which each form an article. In this case, each cavity is generally supplied with flowable compound by a dedicated gate and a nozzle tip.

Particularly when using nozzles with multiple nozzle tips and a control loop, inhomogeneous material flow can occur, which can, for example, lead to the formation of streaks and filling differences and/or a plug in the region of the pre-chamber. Phenomena of this kind can make an article unusable and correspondingly lead to an increased number of rejects.

Against this background, it is an object of the presented invention to minimize rejects when producing articles with an injection moulding tool, in particular a multi-cavity tool.

Thus, according to a first aspect of the presented invention, a nozzle insert for an injection moulding tool is presented.

The presented nozzle insert comprises a supply line portion extending in the nozzle insert, a multiplicity of nozzle tips, and a multiplicity of secondary channels, wherein respective secondary channels of the multiplicity of secondary channels are fluidically coupled to the supply line portion and wherein a respective secondary channel of the multiplicity of secondary channels is configured to discharge flowable compound, supplied through the supply line portion, from a respective nozzle tip of the multiplicity of nozzle tips.

The presented invention is based on a nozzle insert, that is to say a component configured for connection to a material tube.

The nozzle insert comprises multiple channels which are for example provided by bores. As an alternative, the presented nozzle insert may also be produced in a generative production process, such as 3D printing, in which the channels are left out such that material forming the nozzle insert is formed around the channels.

The channels formed in the nozzle insert are configured to conduct flowable compound and comprise a supply line portion, which is supplied with flowable compound by a source during operation, and a multiplicity of secondary channels, which are supplied with flowable compound by the supply line portion during operation. Correspondingly, the supply line portion leads into the secondary channels or is fluidically coupled thereto.

For the fluidic coupling of the supply line portion to respective secondary channels, the secondary channels may engage into the supply line portion, for example one after the other in the flow direction into the supply line portion. As an alternative or in addition, the supply line portion may lead into a reservoir, into a selection of the secondary channels or all of the secondary channels. In this case, the reservoir can have a greater volume than the supply line portion or a greater cross section than the supply line portion, such that the reservoir acts as a buffer which homogenizes a material flow through the nozzle insert.

The fluidic coupling of the supply line portion to the secondary channels requires that compound flowing through the supply line portion does not flow out through the supply line portion per se and correspondingly not, as is customary in the prior art, out of a central opening in the nozzle insert.

Instead, the presented nozzle insert is provided with a multiplicity of openings formed at respective nozzle tips rather than a central opening, such that flowable compound is divided among respective secondary channels of the nozzle insert and exits the nozzle insert at multiple different points.

Tests have surprisingly shown that the use of a nozzle insert with multiple openings for allowing flowable compound to exit the nozzle insert results in a particularly homogeneous material flow, which in particular minimizes formation of plugs in the pre-chamber region. It has also been determined that the presented nozzle insert minimizes the formation of streaks and promotes homogeneous formation of an article in a respective tool. In addition, filling differences between the respective articles in a multi-cavity tool are effectively avoided.

Provision may be made for each secondary channel of the multiplicity of secondary channels to extend through a respective nozzle tip of the multiplicity of nozzle tips.

By way of a respective secondary channel extending through a respective nozzle tip, flowable compound exits the nozzle tip or drains off at the nozzle tip, with the result that the compound is supplied with thermal energy from the nozzle insert up to the outermost edge of the nozzle insert and correspondingly remains hot.

Provision may furthermore be made for at least one secondary channel of the multiplicity of secondary channels to be configured to discharge flowable compound from a side surface of a respective nozzle tip of the multiplicity of nozzle tips.

Flowable compound exiting at a side surface of a respective nozzle tip, in particular at an outer surface of a respective nozzle tip, brings about a material flow through a path between the nozzle tip and a pre-chamber or a wall of a tool plate. Correspondingly, the material flow is conducted through a path with a particularly small cross section at correspondingly high pressure or high speed. This causes particularly high shear forces in the material. These shear forces within the material prevent formation of inhomogeneities or an agglomeration, such as a plug, and mix the flowable compound with itself or circulate it.

Provision may furthermore be made for the side surfaces of the nozzle tips of the multiplicity of nozzle tips to lie on a cylinder surface oriented concentrically with respect to a central axis of the nozzle insert.

A concentric arrangement of the side surfaces of the nozzle tips enables a particularly simple supply of flowable compound to the secondary channels by way of a central supply region or supply region embodied centrally in the cylinder.

Provision may furthermore be made for the side surfaces of the nozzle tips of the multiplicity of nozzle tips to have, in an axial direction with respect to the central axis, at least in certain portions a contour.

A contour, such as a conical profile, a stepped outer diameter or the like, can minimize a distance between the nozzle tips or the nozzle insert and a respective gate. In this case, the contour can correspondingly form, for example, a profile of a cutout forming the gate.

Provision may furthermore be made for secondary channels of the multiplicity of secondary channels to be of equal length.

Secondary channels of equal length produce a uniform material flow out of the nozzle insert, such that for example multiple identical articles can be formed simultaneously at the same rate.

Provision may furthermore be made for secondary channels of the multiplicity of secondary channels to be of different length.

Secondary channels of different length enable different material flows out of the nozzle insert, such that for example one nozzle tip discharges material before another nozzle tip of the nozzle insert and for example different articles can be formed in one operation.

Provision may furthermore be made for secondary channels of the multiplicity of secondary channels to run symmetrically with respect to the central axis of the nozzle insert.

Secondary channels running symmetrically with respect to the central axis of the nozzle insert produce a symmetrical material flow through the nozzle insert, such that a symmetrical formation of multiple in particular identical articles can be achieved.

As an alternative, provision may be made for secondary channels of the multiplicity of secondary channels to run asymmetrically with respect to the central axis of the nozzle insert.

Secondary channels running asymmetrically with respect to the central axis of the nozzle insert enable an asymmetrical material flow through the nozzle insert, such that an asymmetrical formation of multiple in particular different articles can be achieved. Respective secondary channels can differ from one another for example in terms of their profile or their contour, in particular in terms of their curvature.

Provision may furthermore be made for secondary channels of the multiplicity of secondary channels to differ from one another in terms of their cross section.

Different cross sections of respective secondary channels produce a different volume flow of flowable compound through the various secondary channels, such that for example different articles can be formed simultaneously.

Provision may furthermore be made for secondary channels of the multiplicity of secondary channels to run at an acute angle with respect to the central axis of the nozzle insert.

An acute angle of a respective secondary channel with respect to the central axis of the nozzle insert produces a particularly homogeneous material flow, since a pressure acting in the supply portion can be transferred into the respective secondary channels.

Provision may furthermore be made for the nozzle insert to comprise a first seal configured to seal the nozzle insert in relation to a material tube in a radial direction with respect to the central axis of the nozzle insert.

The first seal may, for example, be arranged at an upper end of the nozzle insert, such that leakage of flowable compound into an intermediate region between a respective material tube and the nozzle insert is prevented by the first seal.

Provision may furthermore be made for the nozzle insert to comprise a second seal configured to seal the nozzle insert in relation to the material tube in the axial direction with respect to the central axis.

A second seal may, for example, provide sealing for a surface extending in the axial direction.

Provision may furthermore be made for the nozzle insert to comprise at least two nozzle tips and at least two secondary channels.

In particular, configuring secondary channels in pairs or oppositely in respective nozzle tips has proven to be particularly suitable for preventing an inhomogeneous material flow.

Provision may furthermore be made for the nozzle insert to consist of a highly thermally conductive material.

The presented nozzle insert may consist of a highly thermally conductive material, such as bronze, copper, aluminium or steel.

A highly thermally conductive material, in particular a material having a thermal conductivity $\lambda>100$, produces a particularly efficient transfer of heat from the nozzle insert to a compound flowing through the nozzle insert and along respective nozzle tips, with the result that the compound remains at a predefined temperature for a particularly long period of time.

According to a second aspect, the presented invention relates to a nozzle for an injection moulding tool.

The presented nozzle comprises a material tube, a supply line, which extends through the material tube, for receiving flowable compound from a source, and a possible embodiment of the presented nozzle insert.

Owing to the presented nozzle insert, the presented nozzle enables a particularly homogeneous material flow.

Provision may be made for the nozzle insert and the material tube to form a monolith.

A monolithic nozzle produces a particularly homogeneous heat flow through the nozzle, with the result that compound flowing through the nozzle is heated uniformly.

Provision may furthermore be made for the nozzle insert and the material tube to be connected by way of a connecting interface.

A connecting interface, such as a screw thread or a mechanical locking mechanism, allows the nozzle insert to be exchanged, such that the material tube can remain in the injection moulding tool when another nozzle insert is required.

It may furthermore be provided that, in the region of the connecting interface, the nozzle insert forms a neck portion surrounded by the material tube.

A nozzle insert neck portion surrounded by the material tube produces a high transfer of thermal energy from the material tube to the nozzle insert and correspondingly a particularly homogeneous material flow through the nozzle insert.

It may furthermore be provided that, in the region of the connecting interface, the material tube forms a neck portion surrounded by the nozzle insert.

A material tube neck portion surrounded by the nozzle insert also produces a high transfer of thermal energy from the material tube to the nozzle insert and correspondingly a particularly homogeneous material flow through the nozzle insert.

Provision may furthermore be made for the material tube and the nozzle insert to lie flatly on one another in the region of the connecting interface.

A flat bearing surface between material tube and nozzle insert enables rapid and simple separation or changing of the nozzle insert.

According to a third aspect, the presented invention relates to an injection moulding tool for processing a flowable compound.

The presented injection moulding tool comprises a possible embodiment of the presented nozzle insert and a tool plate with a pre-chamber.

Provision may be made for the nozzle tips of the nozzle insert to be arranged in the pre-chamber.

Due to the nozzle tips of the presented nozzle insert being arranged in the pre-chamber of a tool plate, a flow geometry of material exiting the secondary channels is determined by the shape of the nozzle tips and the shape of the pre-chamber.

Provision may furthermore be made for respective secondary channels of the multiplicity of secondary channels of the nozzle insert to lead, in a side surface of a respective nozzle tip, into a path which extends between the respective nozzle tip and a wall of the pre-chamber.

A path which extends between a respective nozzle tip and a wall of a respective pre-chamber generally exhibits a particularly small cross section and produces correspondingly high shear forces within a material flow flowing through the path, with the result that aggregations in the material flow are minimized.

A path which extends between a respective nozzle tip and a wall of a respective pre-chamber also produces a transfer of thermal energy from the nozzle tip to material flowing in the path, with the result that the material is heated up to the end of the nozzle tip.

Provision may furthermore be made for the injection moulding tool to comprise a multi-cavity tool.

In combination with the presented injection moulding tool, a multi-cavity tool enables simultaneous production of a multiplicity of particularly homogeneous articles.

Provision may furthermore be made for the injection moulding tool to comprise a family tool.

In combination with the presented injection moulding tool, a family tool enables simultaneous production of a multiplicity of particularly homogeneous and possibly different articles.

According to a fourth aspect, the presented invention relates to a production method for producing an article, in which an article is formed by means of a possible embodiment of the presented nozzle insert.

Owing to the presented nozzle insert, the presented production method provides articles of particularly homogeneous form and produces a particularly low number of rejects.

Figure 2:
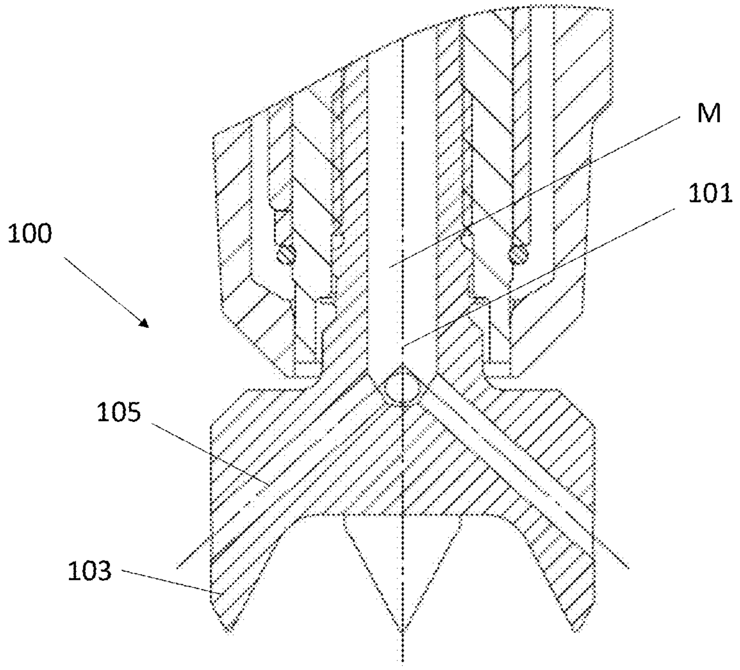
Figure 3:
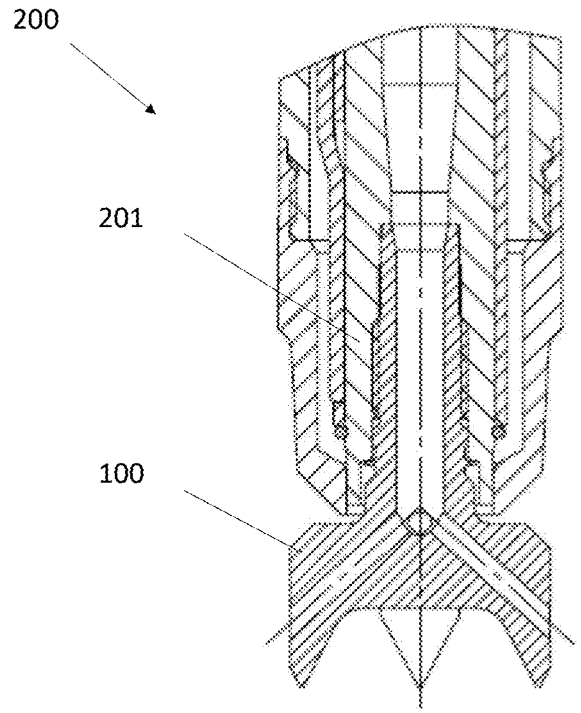
Figure 4:
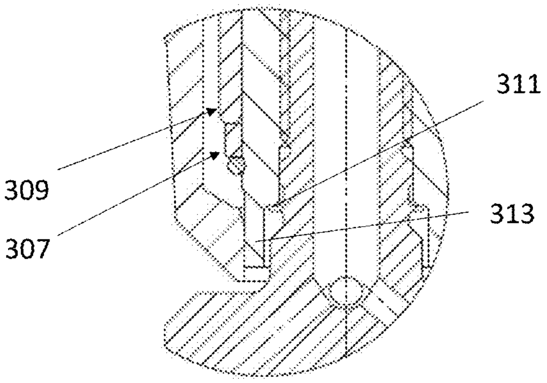

Further features, details and advantages of the invention can be gathered from the wording of the claims and also from the following description of exemplary embodiments with reference to the drawings, in which:

FIG. 1 shows a possible embodiment of the presented injection moulding system with a possible embodiment of the presented nozzle and a possible embodiment of the presented nozzle insert, FIG. 2 shows a detail illustration of the nozzle insert according to FIG. 1, FIG. 3 shows a detail illustration of the nozzle according to FIG. 1, FIG. 4 shows a detail illustration of the nozzle according to FIG. 3.

FIG. 1 illustrates an injection moulding tool 300. The injection moulding tool 300 comprises a nozzle 200 and a tool plate 301 which forms a pre-chamber 303.

The nozzle 200 comprises a material tube 201, a supply line 203 extending through the material tube 201, and a nozzle insert 100.

The nozzle insert 100 comprises a supply line portion 101 extending through the nozzle insert 100, a multiplicity of nozzle tips 103, and a multiplicity of secondary channels 105.

Respective secondary channels 105 are fluidically coupled to the supply line portion 101 and configured to discharge flowable compound, supplied from a source through the supply line portion 101, from a respective nozzle tip 103.

FIG. 2 illustrates a detail view of the nozzle insert 100 according to FIG. 1.

It can be seen here that by way of example the secondary channels 105 run symmetrically about a central axis M of the nozzle insert 100 and each open out in a side surface 107 of a respective nozzle tip 103, with the result that the flowable compound at the side surfaces 107 of the nozzle tips 103 passes through a path 109 and, as a result, is heated the entire way through the path 109 along the nozzle tip by thermal energy stored in the nozzle insert 100.

Since the path 109 between the nozzle tip 103 and a wall of the pre-chamber has a particularly small cross section, the path 109 produces high shear forces in a material flow through the path 109, with the result that agglomerations in the material flow are prevented.

The path 109 also produces a transfer of thermal energy from the nozzle tip 103 to material flowing in the path 109, with the result that the material is heated up to the end of the nozzle tip 103.

FIG. 3 illustrates the nozzle 200 in detail. It can be seen here that the nozzle insert 100 is detachably connected to the material tube 201, such that the nozzle insert 100 can be changed.

FIG. 4 illustrates a further detail view of the nozzle insert 100. Here, a position of a thick film heating element at the end of the material tube 201 is illustrated by arrow 307 and a position of a temperature sensor is illustrated by arrow 309.

Seal elements 311 and 313 are optionally also illustrated in FIG. 4.

The invention is not restricted to any one of the embodiments described above and instead can be modified in a very wide variety of ways.

All of the features and advantages apparent from the claims, the description and the drawing, including structural details, spatial arrangements and method steps, may be essential to the invention both individually and in a very wide variety of combinations.

LIST OF REFERENCE SIGNS

100 Nozzle insert
101 Supply line portion
103 Nozzle tip
105 Secondary channel
107 Side surface
109 Path
200 Nozzle
201 Material tube
203 Supply line

300 Injection moulding tool
301 Tool plate
303 Pre-chamber
305 Wall
307 Arrow
309 Arrow
311 Seal
313 Seal
M Central axis

The invention claimed is:

1. A nozzle insert (100) for an injection moulding tool (300),
wherein the nozzle insert (100) comprises:
a supply line portion (101) extending in the nozzle insert (100),
a multiplicity of nozzle tips (103), and
a multiplicity of secondary channels (105),
wherein respective secondary channels (105) of the multiplicity of secondary channels (105) are fluidically coupled to the supply line portion (101),
wherein a respective secondary channel (105) of the multiplicity of secondary channels (105) is configured to discharge flowable compound, supplied through the supply line portion (101), from a respective nozzle tip (103) of the multiplicity of nozzle tips (103),
wherein at least one secondary channel (105) of the multiplicity of secondary channels (105) is configured to discharge flowable compound from a side surface (107) of a respective nozzle tip (103) of the multiplicity of nozzle tips (103), and that the nozzle insert (100) is configured to provide, together with a wall of a pre-chamber (303) of an injection moulding tool (300), a path which guides the flowable material emerging from the respective secondary channels (105) both in a first direction away from the supply line portion (101) and in a second direction, opposite to the first direction, towards the supply line portion (101).

2. The nozzle insert (100) according to claim 1,
characterized
in that each secondary channel (105) of the multiplicity of secondary channels (105) extends through a respective nozzle tip (103) of the multiplicity of nozzle tips (103).

3. The nozzle insert (100) according to claim 1,
characterized
in that the side surfaces (107) of the nozzle tips (103) of the multiplicity of nozzle tips (103) lie on a cylinder surface oriented concentrically with respect to a central axis (M) of the nozzle insert (100).

4. The nozzle insert (100) according to claim 1,
characterized
in that the side surfaces (107) of the nozzle tips (103) of the multiplicity of nozzle tips (103) have, in an axial direction with respect to a central axis (M), at least in certain portions a contour.

5. The nozzle insert (100) according to claim 1,
characterized
in that secondary channels (105) of the multiplicity of secondary channels (105) are of equal length.

6. The nozzle insert (100) according to claim 1,
characterized
in that secondary channels (105) of the multiplicity of secondary channels (105) are of different length.

7. The nozzle insert (100) according to claim 1,
characterized
in that secondary channels (105) of the multiplicity of secondary channels (105) run symmetrically with respect to a central axis (M) of the nozzle insert (100).

8. The nozzle insert (100) according to claim 1,
characterized
in that secondary channels (105) of the multiplicity of secondary channels (105) run asymmetrically with respect to a central axis (M) of the nozzle insert (100).

9. The nozzle insert (100) according to claim 1,
characterized
in that secondary channels (105) of the multiplicity of secondary channels (105) differ from one another in terms of their cross section.

10. The nozzle insert (100) according to claim 1,
characterized
in that secondary channels (105) of the multiplicity of secondary channels (105) run at an acute angle with respect to a central axis (M) of the nozzle insert (100).

11. The nozzle insert (100) according to claim 1,
characterized
in that the nozzle insert (100) comprises a first seal (311) configured to seal the nozzle insert (100) in relation to a material tube (201) in a radial direction with respect to a central axis (M) of the nozzle insert (100).

12. The nozzle insert (100) according to claim 11,
characterized
in that the nozzle insert (100) comprises a second seal (313) configured to seal the nozzle insert (100) in relation to the material tube (201) in an axial direction with respect to the central axis (M).

13. The nozzle insert (100) according to claim 1,
characterized
in that the nozzle insert (100) comprises at least two nozzle tips (103) and at least two secondary channels (105).

14. The nozzle insert (100) according to claim 1,
characterized
in that the nozzle insert (100) consists of a highly thermally conductive material.

15. A nozzle (200) for an injection moulding tool (300),
wherein the nozzle (200) comprises:
a material tube (201),
a supply line (203), which extends through the material tube (201), for receiving flowable compound from a source,
a nozzle insert (100) according to claim 1.

16. The nozzle (200) according to claim 15,
characterized
in that the nozzle insert (100) and the material tube (201) are monolithic.

17. The nozzle (200) according to claim 16,
characterized
in that the nozzle insert (100) and the material tube (201) are connected by way of a connecting interface.

18. The nozzle (200) according to claim 17,
characterized
in that, in a region of the connecting interface, the nozzle insert (100) forms a neck portion surrounded by the material tube (201).

19. The nozzle (200) according to claim 17,
characterized
in that, in a region of the connecting interface, the material tube (201) forms a neck portion surrounded by the nozzle insert (100).

20. The nozzle (200) according to claim 17,
characterized
in that a material tube (201) and the nozzle insert (100) lie flatly on one another in a region of the connecting interface.

21. An injection moulding tool (300) for processing a flowable compound, wherein the injection moulding tool (300) comprises a nozzle insert (100) according to claim 1 and a tool plate (301) with a pre-chamber (303), wherein the nozzle tips (103) of the nozzle insert (100) are arranged in the pre-chamber (303), and respective secondary channels (105) of the multiplicity of secondary channels (105) of the nozzle insert (100) lead, in a side surface (107) of a respective nozzle tip (103), into a path (109) which extends between the respective nozzle tip (103) and a wall (305) of the pre-chamber (303).

22. The injection moulding tool (300) according to claim 21, characterized in that each nozzle tip (103) of the multiplicity of nozzle tips (103) of the nozzle insert (100) is assigned to a gate.

23. The injection moulding tool (300) according to claim 21, characterized in that the injection moulding tool (300) comprises a multi-cavity tool.

24. The injection moulding tool (300) according to claim 21, characterized in that the injection moulding tool (300) comprises a family tool.

25. A production method for producing an article, comprising forming an article using the nozzle insert (100) according to claim 1.

* * * * *